Dec. 26, 1961 R. H. WISE 3,014,379
MOTION-TRANSMITTING DEVICE
Original Filed Feb. 1, 1956 3 Sheets-Sheet 1
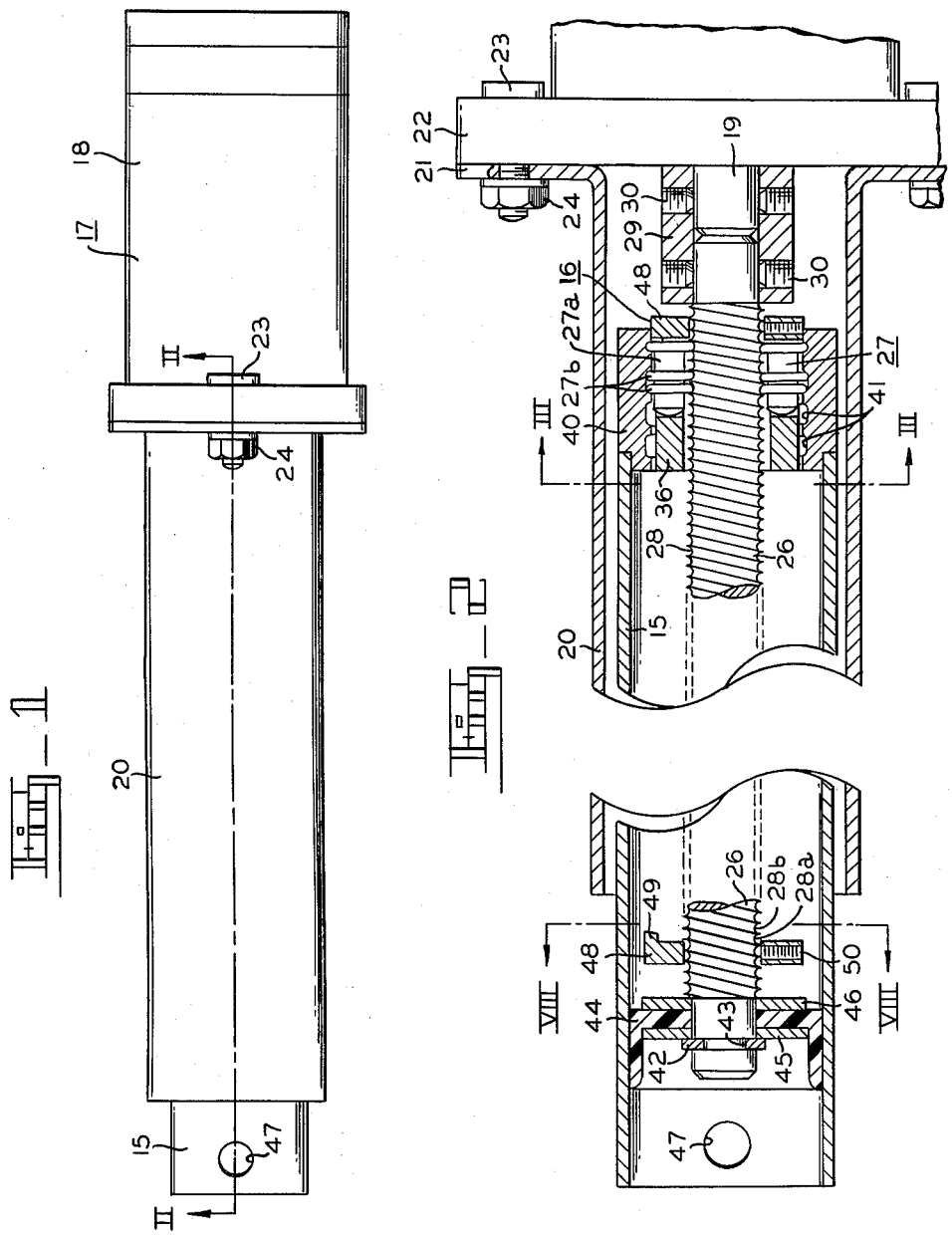
INVENTOR.
RALPH H. WISE
BY Wesley B. Taylor
ATTORNEY Dec. 26, 1961   R. H. WISE   3,014,379
MOTION-TRANSMITTING DEVICE
Original Filed Feb. 1, 1956   3 Sheets-Sheet 2
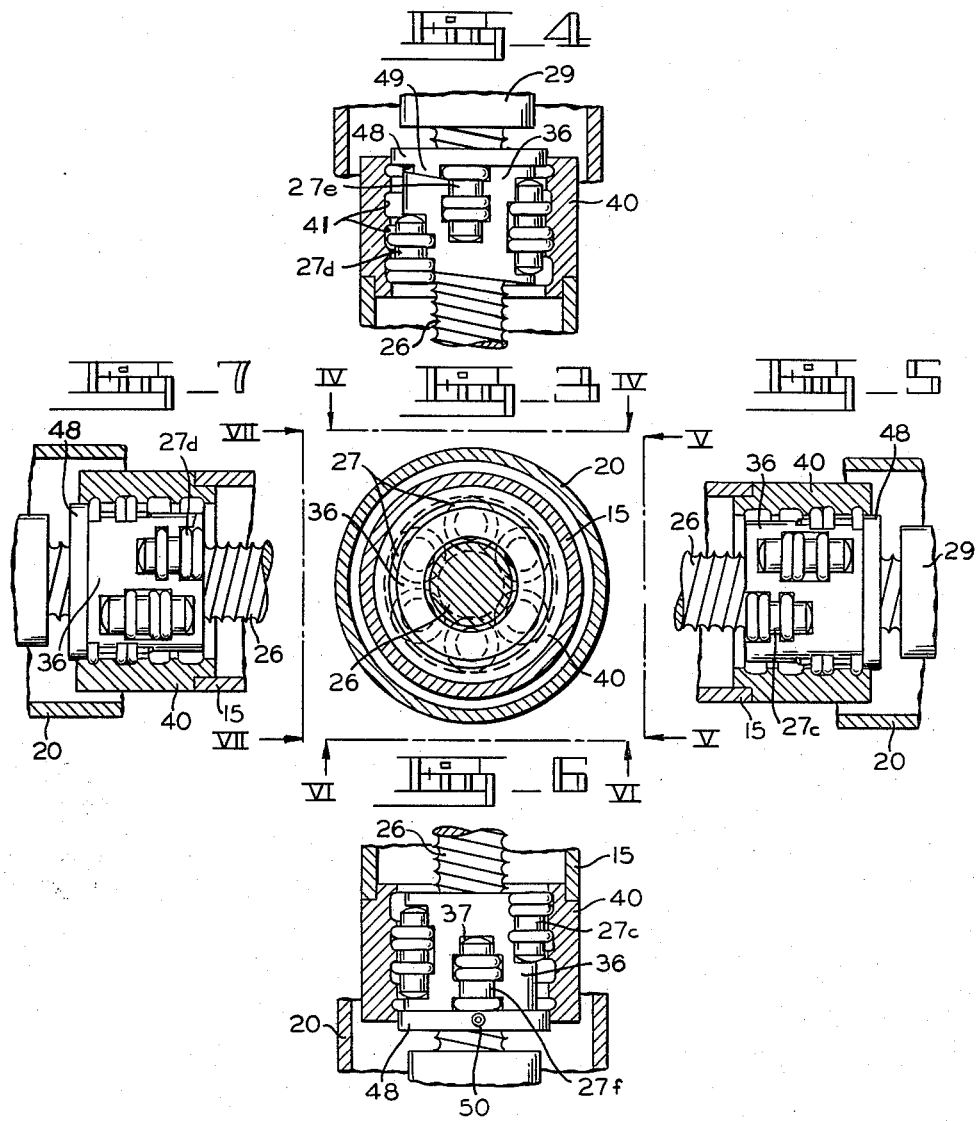
INVENTOR.
RALPH H. WISE
BY *Wesley B. Taylor*
ATTORNEY

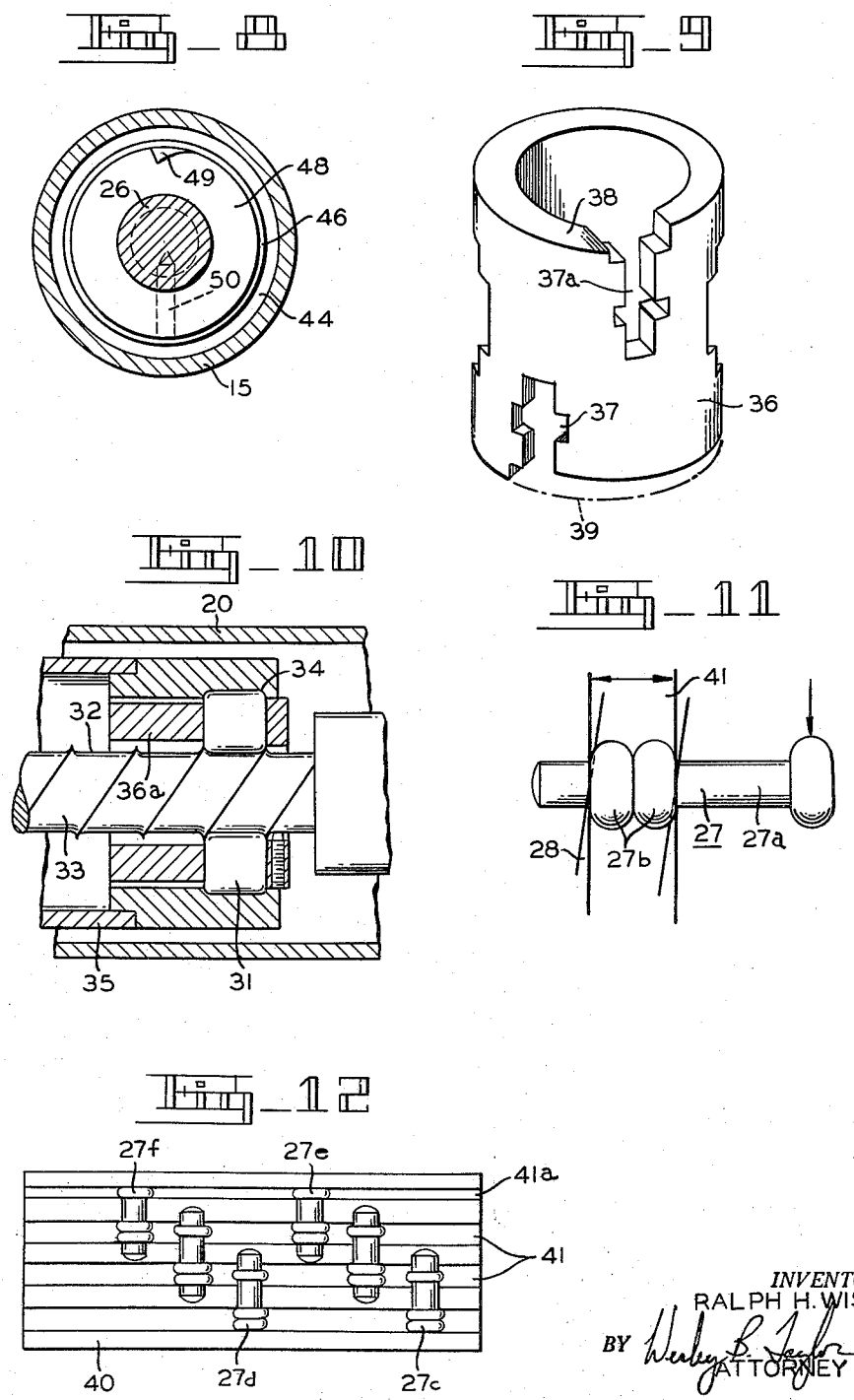

United States Patent Office 3,014,379
Patented Dec. 26, 1961

3,014,379
MOTION-TRANSMITTING DEVICE
Ralph H. Wise, Tampa, Fla., assignor to The Anderson Company, a corporation of Indiana
Continuation of application Ser. No. 562,805, Feb. 1, 1956. This application June 23, 1958, Ser. No. 743,790
7 Claims. (Cl. 74—424.8)

The present invention relates to an improved mechanical movement and, more particularly, to a motion-transmitting device wherein the driving and driven elements can, in effect, be disconnected from one another without damaging any part comprising the device when the motion of the driven element is externally interrupted.

This application is a continuation of my copending application Serial No. 562,805, filed February 1, 1956, now abandoned.

In a motion-transmitting device of the type contemplated, either rotary or translatory motion is applied to a driving or input element and transmitted as either rotary or translatory motion from the driven or output element. For example, in prior devices of this general type a threaded shaft defining an input element may be rotated, and a nut member on the shaft defining an output element and suitably held against rotation may be made to travel axially of the shaft to deliver longitudinal or translatory motion. Ordinarily, stops are employed to engage the nut member and limit its axial movement. In practice, this use of stops has introduced several problems.

If resistance to axial or longitudinal travel of the nut member is applied suddenly, as when the output element or member strikes a stop or otherwise "freezes," the backlash damages the parts of the device and can even break an input element such as a shaft. Even if the external resistance to the motion of the output element is gradually increased, a stalling point is eventually reached at which the resistance overcomes the driving force and the driving element is brought to rest. In those applications where the driving element is the shaft of or connected to a shaft of an electric motor, even a gradual overcoming of the driving force can burn out the motor or inflict other damage. Additionally, when the end of a translatory movement is reached as by striking a stop, the output translatory element is often found to bind or otherwise become so impacted on the stop that it is not possible to retract the output element back toward its starting point. As an instance, the threaded shaft above referred to may be rotated to move the nut member on the threaded shaft in a translatory or axial direction thereof until the nut member strikes a stop. Particularly if the member rams against the stop in a sudden jarring impact, the nut member may become skewed on the shaft or otherwise bound on the shaft or the stop. When it is subsequently attempted to reverse the motor and rotate the threaded shaft in the opposite direction thereby to retract the nut member, it is often found that the motor lacks sufficient power to withdraw the member.

To avoid some of the foregoing problems, it has been suggested to allow the translatory element to rotate freely upon striking a stop or "free wheel" as it is termed here and in the claims. For instance, in the above example, the nut member can rotate freely or free wheel on the threaded shaft after striking a stop in the manner illustrated in Patent No. 2,446,393 to Russell. In this cited patent, for example, roller means is interposed between the input and output elements or, more particularly, between a shaft and a nut member so that the shaft may freely rotate with respect to the nut member when the movement of the latter is stopped.

However, in such a construction it is not possible to ascertain accurately when the point of free wheeling actually begins. Often the resistance to relative rotary movement between the threaded shaft and nut member is virtually the same before and after a stop engages the nut member. Thus there is no convenient manner of determining when the output element has reached the extent of its permissible travel. In such cases, the input element may be needlessly driven even though free wheeling between the input and output elements has already begun. Moreover, even if the power to the driving element is cut simultaneously as the driven or output element strikes a stop or otherwise reaches the end of its permissive travel, the inertia forces of the driving and driven elements and their associated parts compels continued relative movement between the input and output elements until such energy is dissipated. Thus, referring again to the foregoing exemplary structure, the threaded shaft may continue to rotate for an appreciable time after the nut member reaches a stop, even though the power means normally rotating the shaft is inactive. There results a rattling, vibrant noise which accompanies the use of such a device and makes its application undesirable in apparatus designed for personal use, such as in a vehicle seat adjuster, vehicle window regulator, and the like.

The present motion-transmitting device obviates all of the foregoing faults. In my device the driving and driven elements are designed to rotate with respect to each other when the motion of the driven element is externally interrupted and thereby avoid shocks and backlash to the input or driving element. However, in the present invention the free wheeling which takes place is accompanied by an increase in resistance to such relative rotary movement, so that the point at which free wheeling begins may be promptly and accurately determined. Additionally, when the power to the driving element is cut, this increased resistance readily absorbs the inertia forces of the input and output elements, so that these parts are quickly and quietly brought to rest.

Preferably, the increase in resistance to relative rotary movement between the input and output members is of a frictional nature. This may be accomplished by having the stops directly engage the roller means which is stationed between the input and output elements. In one form, I use elongated roller means or substantially cylindrical bearing elements and provide the nut member with a groove which is angularly related to a helical groove on a shaft. Stop means engage a side of an elongated bearing element and wedges it between the angularly related grooves. This prevents the bearing element from continuing to travel the helical groove of the shaft, so that the relative longitudinal or translatory movement between the input and output elements is halted. The bearing element, however, is still free to travel the groove in the nut member, and consequently relative rotary movement or free wheeling between the elements is possible. Nevertheless, because of its wedged condition, the bearing element moves with greater difficulty along the groove of the nut member such that the free wheeling which takes place does so against an automatically increased resistance to such relative rotary movement.

The accompanying drawings illustrate a presently preferred embodiment wherein:

FIGURE 1 is a side view of a device embodying the present invention which is adapted for transmitting rotary motion into translatory motion or vice versa;

FIGURE 2 is a longitudinal section of FIGURE 1 on the line II—II;

FIGURE 3 is a section of FIGURE 2 on the line III—III;

FIGURES 4, 5, 6, and 7 are views of FIGURE 3 along the planes of the lines IV—IV, V—V, VI—VI, and VII—

VII, respectively, with parts broken away for purposes of illustration;

FIGURE 8 is a section of FIGURE 2 on the line VIII—VIII;

FIGURE 9 is a perspective view of a cage member which may house the bearing elements;

FIGURE 10 is a fragmentary longitudinal section of a modification showing a different type of bearing element which may be used;

FIGURE 11 is a diagrammatic sketch illustrating how a bearing element is wedged between the angularly related grooves of the shaft and nut member; and FIGURE 12 is a developed view of the nut member and the bearing elements which engage it.

In the present motion-transmitting device, the driving element may be a rotating or translating element and may itself be driven by either rotary or translatory motion by means known in the art. Similarly, the driven element of the present device may be either a rotating or translating element and adapted to deliver either rotary or translatory motion. As disclosed herein, the invention is illustrated as a rotary input element directly receiving rotary motion and a translatory output element directly transmitting translatory motion. As such, the device has many applications such as raising and lowering a vehicle window, adjusting a seat of a vehicle, opening and closing a tailgate on a vehicle such as a station wagon, and other like applications.

*Structure*

Referring to the drawings, a device of the type last mentioned includes a tubular member or rider 15 driven in a longitudinal direction by motion-transmitting means generally indicated at 16 which is actuated by a power unit 17. The latter comprises a housing 18 which may be suitably supported in any desired position and contains a reversible motor (not shown). The motor has a shaft 19 which projects into a protecting sleeve 20. The sleeve covers the motion-transmitting means 16 and to this end has a flange 21 secured against a flange 22 on the housing by bolts 23 and nuts 24.

The motion-transmitting means 16 includes a shaft 26 which in the embodiment shown defines a rotary input element, bearing elements 27, and the rider or tubular member 15 which in the present case defines a translatory output element. The shaft 26 has a helical groove 28 extending around its periphery which may be formed by conventionally threading the shaft. A collar 29 and set screws 30 couple an unthreaded adjacent end of the shaft 26 to the motor shaft 19.

The bearing elements 27 transmit relative longitudinal movement between the shaft 26 and the rider or tubular member 15. It has been found that the type of bearing element best suited for both this purpose and for the previously described wedging action is one of elongated or spindle shape. Accordingly, in the preferred embodiment substantially cylindrical bearing elements are used. Preferably these bearing elements are of the type disclosed and claimed in my copending application filed September 26, 1955, Serial No. 536,515, and represented in the present application at 27. Such bearing elements have a spindle or shaft 27a and radially enlarged bearing surfaces or portions 27b, preferably of torodial shape. There are three radially enlarged portions on each bearing element in the embodiment presently illustrated, two of which are spaced sufficiently close to engage the same thrust transmitting means of the rider 15 as hereinafter described. When bearing elements 27 are used, the shaft may have two helical grooves, for example, grooves 28a and 28b which are spaced axially from one another to accommodate the two more closely spaced bearing surfaces of the bearing elements.

Bearing elements of the type just described are preferred since substantially point-to-point contact is obtained between the shaft 26 and the rider or tubular member 15. However, it is not critical to the present invention to use these bearing elements. FIGURE 10 illustrates a modification wherein cylindrical bearing elements 31 of uniform diameter are employed. In this case the helical groove 32 of the shaft 33 and the thrust transmitting surface or groove 34 of a rider 35 are sufficiently widened so that an entire element 31 may fit therein as shown.

A tubular cage member 36 is interposed between the shaft 26 and rider 15 and has openings 37 (FIGURE 9) to house the bearing elements and thereby insure equal spacing of the bearing elements axially and radially about the shaft 26. Thus, elements 27c and 27d extend farther in one direction than the remaining bearing elements, and elements 27e and 27f extend farther in the other direction than the remaining elements, as illustrated diagrammatically in the developed view of FIGURE 12. The openings 37 conform to the shape of the bearing element being used. When, for example, bearing elements 27 are employed, the openings are of general cruciform configuration to accommodate the radially enlarged bearing surfaces 27b. In the embodiment of FIGURE 10, a cage 36a may have rectangular openings. In any case, the cages are recessed at opposite ends so as to expose at least partially a side of a bearing element. In this manner, the bearing element may be readily engaged from a side and thrust into the previously mentioned wedging action. Referring to the embodiment of FIGURE 9, the ends of the cage 36 are shaved or cut radially on a bias for approximately one-half of the circumference of the cage. This provides a gradually recessing arcuate portion 38 which terminates along a side of a bearing element. The dotted lines 39 indicate the full ends of the cage 36 prior to such recessing.

The rider or tubular member 15 terminates at its inner end in a thrust receiving collar or nut member 40 suitably secured to the rider. As illustrated in the developed view of FIGURE 12, the nut member 40 has internal grooves 41 in which the bearing surfaces 27b of the elements seat to transmit translatory motion to the nut member and rider 15. The grooves 41 are angularly related to the helical groove 28 of the shaft 26, as shown best in FIGURE 2 and the schematic sketch of FIGURE 11. The grooves 41 of the nut member are of sufficient width to accommodate two of the radially enlarged bearing surfaces 27b, although the end groove 41a may be of a width to accommodate only one of such bearing surfaces so as further to stabilize the end bearing elements 27e and 27f.

Suitable means may be used to guide the translatory movement of the rider 15 along the shaft 26. In one form, a snap ring 42 fits into a groove 43 in an outer unthreaded end of the shaft 26 to hold a cup-shaped wear plate 44 and a pair of reinforcing plates 45 and 46, which are disposed on opposite sides of the wear plate, against the threaded portion of the shaft. The free end of the tubular member 15 has a pair of radially opposed apertures 47 for attaching the member 15 to a part intended to receive the translatory motion.

Stops limit the travel of the bearing elements 27 along the helical groove 28. The stops may take the form of discs 48 having a center opening to receive the shaft 26. A disc is stationed opposite each end of the cage 36 and spaced therefrom. Each disc has a lug or detent 49 facing the nut member. Preferably, the discs 48 are of smaller diameter than the internal diameter of the nut member 40 to permit some telescoping, if desired. Each detent 49 is radially positioned with respect to the shaft 26 so as to engage one of the adjacent end bearings 27c, 27d, 27e, or 27f when the cage member 36 is immediately adjacent a stop 48 (FIGURE 4). Set screws 50 hold the discs 48 and detents 49 in such an element-engaging position.

*Operation*

In practice, the shaft 26 rotates in either direction to move the rider 15 toward the right or left as viewed in FIGURE 2. Since the action is the same in either case, movement of the rider 15 and nut member 40 toward the right is assumed for purposes of explanation. As the shaft rotates, the bearing elements 27 are frictionally rotated on their own individual axes while simultaneously planetating about the shaft 26 in the helical groove 28. The resulting longitudinal movement of the elements 27 relative to the axis of the shaft 26 is transmitted to the nut member 40, since the bearing surfaces 27b of the elements engage the lateral walls of the grooves 41 to urge the nut member and therefore the rider 15 in the direction of travel of the elements along the axis of the shaft 26. Ordinarily, the rate of individual rotation of the bearing elements is slower than that of the shaft 26 to provide a mechanical advantage.

This motion is continued until the bearing elements 27 near a stop or disc 48. At this time, because of the positioning of the stop relative to the elements, a detent 49 engages a side of the end bearing element 27e in opening 37a of the cage, so that the parts are related as shown in FIGURES 4, 5, 6 and 7. This engagement with element 27e wedges it between the angularly related grooves 28 and 41, as schematically illustrated in FIGURE 11. Elongated bearing elements are well suited for this purpose, since the detent cannot slip around or miss a bearing element having a much greater length in comparison to its width. Striking any portion of a bearing element urges the entire element in a lateral direction with respect to the axis of the shaft 26.

As a result, the engaged bearing element preferably loses its ability to rotate on its own axis and becomes locked in a fixed position with respect to the shaft 26. In any event, the bearing elements are prevented from advancing along the helical groove 28 so that relative longitudinal movement between the shaft 26 and nut member 40 is halted. However, the elements are still free to travel in the grooves 41 of the nut member. In this manner, free wheeling between the shaft 26 and nut member 40 is still possible, and the shaft may continue to rotate even after a stop 48 strikes a bearing element. Accordingly, there is no backlash along the shaft 26 or any of the other disadvantages attendant the stopping of the longitudinal movement of a nut member in the absence of what has herein been termed free wheeling.

Although free wheeling is thus provided for, there is increased resistance to such relative rotary movement between the shaft 26 and nut member 40. This increased resistance is obtained frictionally. Because of the engagement of the detent 49 with a side of a bearing element, the latter moves with greater difficulty in the grooves 41. When the bearing element is locked against individual rotation, as is preferred, the radially enlarged bearing surfaces 27b, or the bearing elements 31 in the modification of FIGURE 10, slide rather than roll in the grooves of the nut member. In some cases, depending on the tolerance permitted between the bearing elements and the openings of the cage member, the engaged element may be somewhat skewed with respect to the axis of the cage to provide the desired increased resistance to travel in the grooves 41. Also, since locking one of the elements 27 or 31 with respect to their respective shaft causes the cage 36 or 36a to be similarly positioned with respect to the shaft, the other bearing elements housed in the cage and not engaged by a stop may also lose their individual rotation and likewise slide in the grooves 41.

The increased resistance is immediately noticeable as by the increased power required by the unit 17 or especially if the shaft 26 is handpowered. Accordingly, the point at which free wheeling begins is easily and accurately determined. Should the power unit 17 be stopped when a detent 49 engages a bearing element or shortly thereafter, the shaft 26 quietly and almost immediately comes to rest because its inertia forces are rapidly absorbed by the increased resistance to relative rotary movement between the shaft and nut member. When the rotation of the shaft 26 is reversed, the bearing elements 27 are easily retracted from the detent 49 since the nut member 40 or elements 27 are not rigidly skewed with respect to the shaft 26 or otherwise bound on the shaft or the detent 49.

The reverse of the action just described is possible, that is, translatory motion can be transmitted as rotary motion. For example, by providing the shaft 26 with threads of appreciable lead, the rider or tubular member 15 can be translated axially along the shaft 26 to cause its rotation. This rotation can be ultimately delivered from the shaft 26 either directly as rotary motion or as translatory motion in a manner just described.

Although the foregoing disclosure describes a presently preferred embodiment and a modification thereof, it is understood that the invention may be practiced in still other forms within the scope of the following claims.

I claim:

1. A motion-transmitting device including a rotatable member having a helical groove on the periphery thereof, a second member telescoping the first and having thrust-transmitting means, elongate bearing elements interposed between the two members and simultaneously engaging the groove and the thrust-transmitting means, said bearing elements having their greater lengths disposed longitudinally of the members and being adapted to planetate about said first member in the helical groove while engaging the thrust-transmitting means of the second member to transmit relative longitudinal and rotary movement between the members, an annular cage member disposed about the rotatable member and spaced therefrom housing the elongate bearing elements therein spaced relation, and fixed stop means on said first rotatable member stationed opposite the ends of the bearing means to directly engage a side of a bearing element to bind it in its position between the members and stop the relative longitudinal movement between the members without stopping their relative rotary movement.

2. A motion-transmitting device including a rotatable shaft having a helical groove on the periphery thereof, spindle-shaped bearing elements disposed along the shaft and adapted to engage the groove and planetate about the shaft while rotating on their own axes to simultaneously move longitudinally of the shaft, a cage member about the shaft and housing the bearing elements, a rider member having thrust-transmitting means to engage the bearing elements whereby relative longitudinal and rotary movement between the rider member and the shaft is permitted, and stop means fixed with respect to the shaft and stationed opposite the ends of the bearing elements to directly engage a side of a bearing element and bind it in its position between the shaft and rider member to stop their relative longitudinal movement and increase the resistance to their relative rotary movement without stopping said rotary movement, said shaft defining an input element when said rider member defines an output element and vice versa.

3. A mechanical movement for transmitting rotary motion as translatory motion including a rotatable input shaft having a helical groove on the periphery thereof, a translatable output member disposed along the shaft and having grooves extending radially about the shaft, elongate bearing elements disposed along the shaft and having enlarged radial portions simultaneously engaging the grooves of the shaft and the translatable member, said bearing elements being normally rotatable on their own axes to planetate about the shaft in the helical groove of the shaft and transmit the resulting translatory movement to the translatable member, a cage interposed between the shaft and translatable member and housing the bearing elements, said cage being recessed at its ends to expose at least one bearing element, and stop means stationed opposite the ends of the cage and fixed with respect to the shaft to engage an exposed bearing element from a side thereof and bind the element against continued travel in the helical groove of the shaft while permitting the element to move along the grooves of the translatable member whereby said member and said shaft may freewheel with respect to each other.

4. A mechanical movement as claimed in claim 3 wherein the translatable output member has at least two grooves and the bearing elements have three enlarged radial portions, two of said portions being spaced sufficiently close to engage the same groove in the output member, and the third of said portions engaging another of said grooves.

5. A mechanical movement as claimed in claim 3 wherein the input shaft has a plurality of spaced helical grooves to accommodate the enlarged radial portions of the bearing elements, and power means for rotating the input shaft.

6. A mechanical movement for transmitting rotary motion as translatory motion including an externally threaded shaft defining a rotatable input element, a tubular member encompassing the shaft and defining a translatable output element, said member having internal grooves which are angularly related with the threads of the shaft, substantially cylindrically shaped bearing elements having at least two radially enlarged bearing portions simultaneously engaging the threads of the shaft and grooves of the tubular member, said bearing elements being normally rotatable on their own axes to planetate about the shaft in the threads of the shaft and transmit the resulting longitudinal movement along the shaft as translatory movement in the tubular member, a cage interposed between the shaft and tubular member and having openings to house the bearing elements, said cage being recessed at each end to partially expose at least one bearing element, and stop means stationed opposite the ends of the cage and fixed with respect to the shaft to engage an exposed bearing element from a side thereof to wedge the element between the angularly related threads of the shaft and grooves of the tubular member and lock the engaged element in fixed relation to the shaft whereby continued axial travel of the elements along the threads of the shaft is prevented to stop the relative longitudinal movement between the shaft and tubular member while sliding movement of the locked element in the grooves of the tubular element is permitted to enable the shaft and the tubular element to freewheel with respect to each other but with an increased resistance to such relative rotary movement.

7. A mechanical movement for transmitting rotary motion as translatory motion including a rotatable input shaft having a helical groove on the periphery thereof, a translatable output member disposed along the shaft and having grooves extending radially about the shaft, elongate bearing elements disposed along the shaft and having enlarged radial portions simultaneously engaging the grooves of the shaft and the translatable member, said bearing elements being normally rotatable on their own axes to planetate about the shaft in the helical groove of the shaft and transmit the resulting translatory movement to the translatable member, a cage interposed between the shaft and translatable member and having openings for housing the bearing elements, said cage having spirally formed surfaces on at least one axially faced end portion thereof which terminates in one of the openings containing one of the bearing elements, one end portion of said one contained bearing element, being exposed above the spirally faced end portion, and stop means stationed opposite the ends of the cage and fixed with respect to the shaft to engage said exposed end portion of said one bearing element from a side thereof and bind said one element against continued travel in the helical groove of the shaft while permitting said one element to move along the grooves of the translatable member whereby said member and said shaft may freewheel with respect to each other.

References Cited in the file of this patent
UNITED STATES PATENTS

| | | |
|---|---|---|
| 2,446,393 | Russell | Aug. 3, 1948 |
| 2,462,779 | Russell | Feb. 22, 1949 |